US006018649A

United States Patent [19]

Rühl

[11] Patent Number: 6,018,649

[45] **Date of Patent: *Jan. 25, 2000**

[54] RDS-TMC RADIO RECEIVER FOR PROCESSING REGION-SPECIFIC AND SUPRA-REGIONAL ROAD OR AREA INDICATIONS

[75] Inventor: Hans W. Rühl, Röthenbach, Germany

[73] Assignee: Mannesmann VDO AG, Frankfurt, Germany

[ * ] Notice: This patent is subject to a terminal disclaimer.

[21] Appl. No.: 08/916,779

[22] Filed: Aug. 20, 1997

[30] Foreign Application Priority Data

Sep. 13, 1996 [DE] Germany .......................... 196 37 258

[51] Int. Cl.[7] ...................................................... H04B 1/18

[52] U.S. Cl. ........................................................ 455/186.1

[58] Field of Search ................................ 455/186.1, 558, 455/432, 185.1

[56] References Cited

U.S. PATENT DOCUMENTS

| | | | |
|---|---|---|---|
| 5,752,177 | 5/1998 | Siegle et al. | 455/186.1 |
| 5,784,691 | 7/1998 | Rugl | 455/186.1 |
| 5,819,166 | 10/1998 | Kimura et al. | 455/186.1 |
| 5,913,156 | 6/1999 | Ruhl | 455/186.1 |

OTHER PUBLICATIONS

"Verkehrsfunk in Neuem Gewand" Funkschau Aug. 1992 I Spezial, pp. 22–26.

*Primary Examiner*—Reinhard J. Eisenzopf
*Assistant Examiner*—Greta J. Fuller
*Attorney, Agent, or Firm*—Mayer, Brown & Platt

[57] ABSTRACT

The invention relates to a radio receiver comprising a control circuit (7) for supplying coded messages derived from a radio signal to at least one memory arrangement (12, 28), for receiving control data derived from the coded messages which control data originate from at least one memory arrangement (12, 28), and for forming the messages from the control data in a form suitable for a visual display (13) and/or a voice output circuit (14). For providing a more flexible radio receiver, a reading device (16) for reading data of an external first memory arrangement (28), and a second memory arrangement (12) are coupled to the control circuit (7). The first memory arrangement (28) is used for storing control data for region-specific road or area categories and the second memory arrangement (12) is used for storing control data for supra-regional road or area categories which have each a respective class name.

12 Claims, 3 Drawing Sheets

RDS-TMC RADIO RECEIVER FOR PROCESSING REGION-SPECIFIC AND SUPRA-REGIONAL ROAD OR AREA INDICATIONS

FIELD OF INVENTION

The invention relates to a radio receiver comprising a control circuit

- for supplying coded messages derived from a radio signal to at least one memory arrangement,
- for receiving control data derived from the coded messages and originating from at least one memory arrangement, and
- for forming messages from the control data in a form suitable for a visual display and/or a voice output circuit.

BACKGROUND OF THE INVENTION

Such a radio receiver is known from the journal Funkschau August 1992 I Spezial, pages 22 to 26. In this radio receiver, the audio signals derived from the received radio signal are processed in an audio circuit. RDS and TMC data are also derived from the radio signal. RDS is short for Radio Data System and TMC for Traffic Message Channel. TMC is a function extension of RDS. RDS-TMC data are transmitted along with the radio signal as digitally coded data. TMC offers the radio listener, for example, the possibility of retrieving traffic messages/announcements stored in the radio set as often has he likes before or after the start of the ride, of listening in on traffic announcements selected according to the desired route and of having traffic announcements made in the driver's own native language, irrespective of the language used on the radio. In general, the RDS-TMC data will be referred to as coded messages in the following. It is also conceivable to transmit not only coded traffic announcements, but also weather reports and other messages via RDS-TMC data or similar coded data. The received coded announcements and reports are supplied to a memory arrangement, which then sends control data to a control circuit. A memory arrangement comprises a data file for forming traffic announcements and may be, for example, a semiconductor memory connected to the control circuit, a semiconductor memory provided on a chip card, a CD-ROM, and so on. From said document it is known that the control data are indications of a language in spelling, which indications are used to be produced as voice. In the following, spelling is to be understood to mean the correct spelling of indications of a language. To be able to produce the indications in a language, the control circuit can fall back on a stored digitally coded voice signal file.

The TMC data can also be transmitted over the data channel by DAB, GSM or paging systems. These systems may then be interpreted as radio receivers receiving a radio signal which contains TMC data.

SUMMARY OF THE INVENTION

It is an object of the invention to provide a radio receiver which can be used in a flexible manner.

The object is achieved by a radio receiver of the type defined in the opening paragraph, in that a reading device for reading data from an external first memory arrangement, and a second memory arrangement are coupled to the control circuit, and in that the first memory arrangement is used for storing control data for region-specific road or area categories and the second memory arrangement is used for storing control data for supra-regional road or area categories, which categories have each a respective class name.

Two memory arrangements supply the radio receiver according to the invention with control data which are necessary for decoding a coded message. Such a memory arrangement may be, for example, an internal memory arrangement (for example, semiconductor memory) provided in the radio receiver, and an external memory arrangement (for example, a semiconductor memory provided on a chip card). For reading data from the external, first memory arrangement, a reading device is necessary (chip card reader) which is intended for extracting data from the first memory arrangement provided on the chip card. In addition to the control data for coded messages, the first memory arrangement contains control data for region-specific road or area categories. Such a region-specific road category may be, for example, a "Route Nationale" (N-road) in the region of "France". As a region-specific area category for the region of "Germany" may be stated the "Regierungsbezirk" (district), or for the region of "Switzerland", the "Kanton" (canton). The second memory arrangement could, for example, be fitted in the radio receiver and contain control data for supra-regional road or area categories which can be understood in many regions. The "Département Strasse" (D-road) could be stored for the region-specific road category of "Route Nationale" under a road category "road".

Class names are assigned to the respective road or area categories. If no area category is available for a class name in the first memory arrangement, the road or area category stored in the second memory arrangement is fallen back on when a message is formed. As a result, region-specific road or area categories can be stored on an exchangeable storage medium (chip card) which changes from one region to the next. Road and area categories which hold for the supra-regional regions are stored in the other memory arrangement fitted in the radio receiver. As a result, the radio receiver can be used in a much more flexible manner.

When a message containing a name of a road or area is formed, a class name assigned to the control data of the name of the road or area is extracted from one memory arrangement. Subsequently, a check is made whether control data for road or area categories are stored for this class name in the first memory arrangement. In that case, the respective control data for road or area categories are produced by the first memory arrangement. Otherwise, the control data for road or area categories, which control data correspond to the class names, are extracted from the second memory arrangement.

To reduce the data file, the two memory arrangements are used for storing specific, ever different control data each time under a replacement code. The control circuit, after it has received control data which contain at least one replacement code, is used for supplying at least one replacement code to the first or second memory arrangement and for receiving the control data stored under the replacement code.

Control data assigned to a replacement code are stored in the two memory arrangements. Such control data assigned to a replacement code contain frequently used indications such as, for example, "Köln" (Cologne), "Anschlußstelle" (junction) and so on. If the control circuit receives respective control data from the first or second memory arrangement in response to a coded message, which control data contain at least one replacement code, the respective message (for example, traffic announcement) for a voice output circuit and/or a visual display can be formed only when the control data stored under a replacement code have been supplied to the control circuit. Since such replacement codes need less storage space than the control data, the data file is reduced in consequence. This is especially advantageous when the radio receiver is used for traffic announcements and data of a large traffic area (for example, Germany) are stored in one memory arrangement. A further advantage is that an appropriate selection of control data stored under a replacement code ensures a minimization of possible errors which could occur when the data file is set up and become visible or audible respectively, on the visual display and/or the voice output circuit. An appropriate selection of control data stored under a replacement code is understood to mean a selection of word sequences, words and parts of words (indications) from the point of view of linguistics.

It is possible that for forming the message for the visual display and/or voice output circuit, the control circuit is to access at least one memory arrangement various times to read control data stored under replacement codes. This may be explained by two examples. For the indication "Anschlußstelle Köln-Mühlheim" (Cologne-Mühlheim junction), it is possible that a memory arrangement contains "12365-Mühlheim" or "78654 43263-Mühlheim" as control data. In the former case the control circuit reads, for example, the control data "32987 Köln" (Cologne) for the replacement code "12365". After this, the control data (in this case: "Anschlußstelle") are to be read for the replacement code "32987" to be able to assemble the indication. In the latter case, the control circuit extracts the indications "Anschlußstelle" (junction) and "Köln" (Cologne) under the replacement codes "78654" and "43263" from at least one memory arrangement.

The two memory arrangements contain control data stored under a coded message or a replacement code, and an indication in spelling or phonetic notation of at least a first language can be derived from these control data. Control data may contain partial or complete replacement codes which represent a specific indication in spelling and/or phonetic notation. This may also relate to indications which do not belong to the first language and are taken from another language. For example, there is no German equivalent indication for the Dutch area of "Twente". If the German language is the first language, the Dutch spelling of the area "Twente" would, for example, be stated in the German language spelling under the respective replacement code in at least one memory arrangement.

The data reduction becomes considerable when the spelling and phonetic notation of various languages are stored in the two memory arrangements. In that case, not only the control data of the first language, but also control data of another language are stored in the two memory arrangements under a respective coded message or a replacement code, only if the spelling and/or phonetic notation of the other language differs from the first language. This way of storing control data of other languages can further reduce the number of data.

The memory arrangements contain lists assigned to memory areas, which lists state specific control data assigned each to a coded message and a replacement list stating the respective replacement codes and assigned control data.

The lists contain not only control data in spelling and/or phonetic notation for a coded message, but also a class name for the case where the coded message refers to a road or area name. If, for a coded message, a road or area name is found in a list, the list is further checked for what class name is assigned to the road or area name. With the aid of this class name, a road or area category is extracted from the first or second memory arrangement and a message is formed from the road or area name and the road or area category. The two memory arrangements contain additional lists assigned to memory areas, which lists have class names and control data for the assigned road or area category.

The first memory arrangement could be part of a chip card which can be inserted into a card reader. The structure of such chip cards and their mode of operation are described in the documents U.S. Pat. No. 5,001,753, U.S. Pat. No. 5,146,499, U.S. Pat. No. 5,163,154 and U.S. Pat. No. 5,168,521. The advantage of such chip cards is that when used in a radio receiver for decoding traffic announcements and/or weather reports, they are provided for a particular area and can thus be easily exchanged when the location or area is changed.

The invention also relates to a module for processing coded messages derived from a radio signal, comprising a control circuit for supplying coded messages derived from the radio signal to at least one memory arrangement, for receiving control data derived from the coded messages and originating from at least one memory arrangement, and for forming messages from the control data in a form suitable for a visual display and/or a voice output circuit.

A reader for reading data of an external, first memory arrangement, and a second memory arrangement are coupled to the control circuit. In the first memory arrangement are stored control data for region-specific road or area categories and in the second memory arrangement are stored control data for supra-regional road or area categories, which categories have each a respective class name.

The invention also relates to a memory arrangement for a radio receiver or for a module for processing coded messages derived from a radio signal, to store control data with each coded message. The memory arrangement is used for storing control data for region-specific road or area categories, which categories have each a respective class name.

Furthermore, the invention relates to a chip card to be inserted into a card reader for a radio receiver or for a module to process coded messages derived from a radio signal, which module comprises a memory arrangement for storing control data for each coded message. The memory arrangement is used for storing control data for region-specific road or area categories, which categories have each a respective class name.

These and other aspects of the invention are apparent from and will be elucidated with reference to the embodiments described hereinafter.

DETAILED DESCRIPTION OF THE PREFERRED EMBODIMENT

Figure 1:
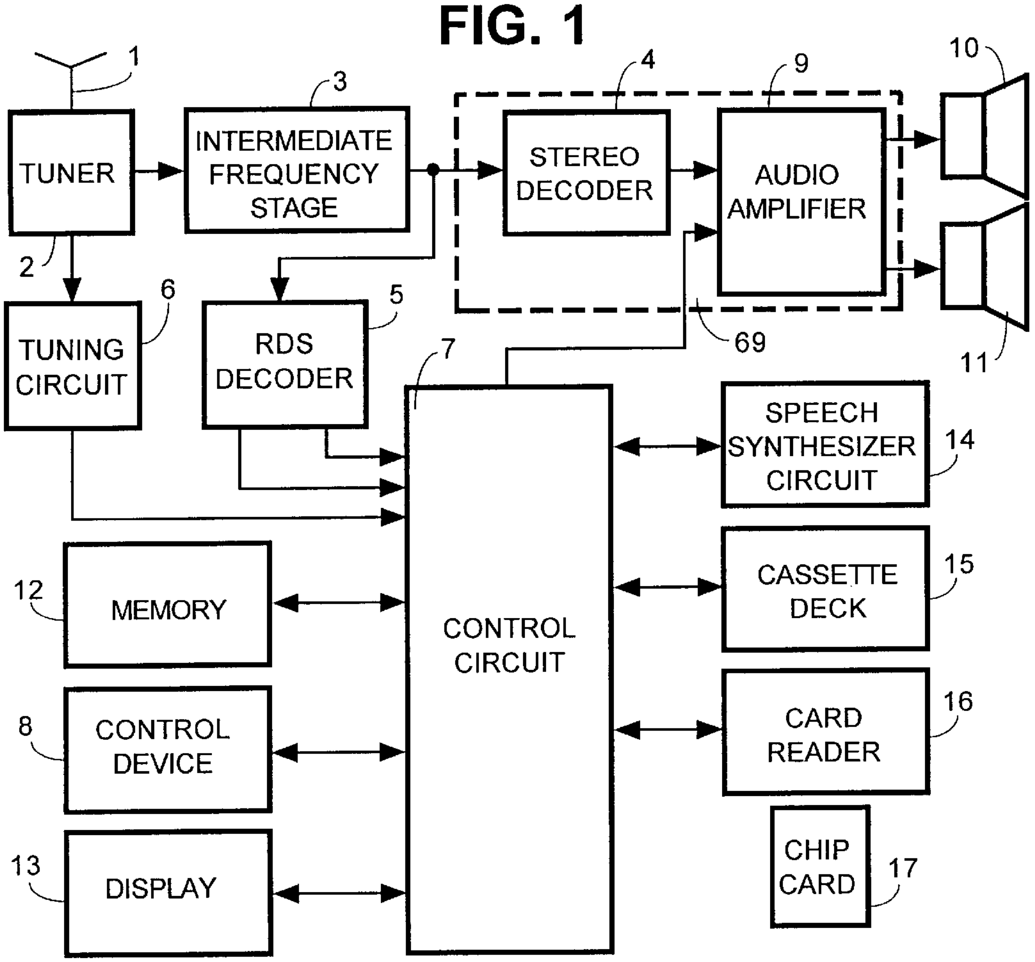
FIG. 1 shows a first illustrative embodiment of an RDS-TMC radio receiver.

FIG. 1 shows a radio receiver for processing radio signals and for decoding and further processing RDS-TMC data. RDS stands for Radio Data System and delivers, for example, traffic announcements, data about alternative frequencies of the tuned transmitter and so on to the radio receiver. TMC is the abbreviation of Traffic Message Channel and represents a function extension of RDS. RDS-TMC data, which represent coded messages, are transmitted along as digitally coded data with the radio signal. TMC provides the radio listener, for example, with the possibility of having traffic announcements, which are stored in the radio receiver made as often as he likes before or after the start of the ride, of selectively listening to traffic announcements depending on the desired route, and of having the traffic announcements made in the listener's own mother tongue independently of the respective language of a country.

The radio signal received from an antenna 1 of the RDS-TMC radio receiver (FIG. 1) is transmitted via a tuner 2 and an Intermediate Frequency stage 3 to a stereo decoder 4 and an RDS decoder 5. The tuner 2 is controlled by a tuning circuit 6 which is set by a control circuit 7 and a control panel 8 connected thereto. The control circuit 7 is, for example, a processing circuit with peripheral circuits (not shown). The stereo decoder 4 produces low-frequency stereo signals which are supplied to two loudspeakers 10 and 11 via an audio amplifier 9. The stereo decoder 4 and the audio amplifier 9 form an audio circuit 69. The RDS decoder 5 extracts RDS-TMC data from the low-frequency signal produced by the Intermediate Frequency stage 3. The RDS-TMC data and, further, a clock signal are delivered to the control circuit 7 by the RDS decoder 5.

Furthermore, a memory 12, a visual display 13, a voice output circuit 14 and, as required, one or more further arrangements 15, for example, a cassette drive, a CD drive, a car telephone and so on, are coupled to the control circuit 7. The memory 12 represents a second memory arrangement. There is further connected to the control circuit 7 a card reader 16 which exchanges data with the chip card 17 for further processing.

Figure 2:
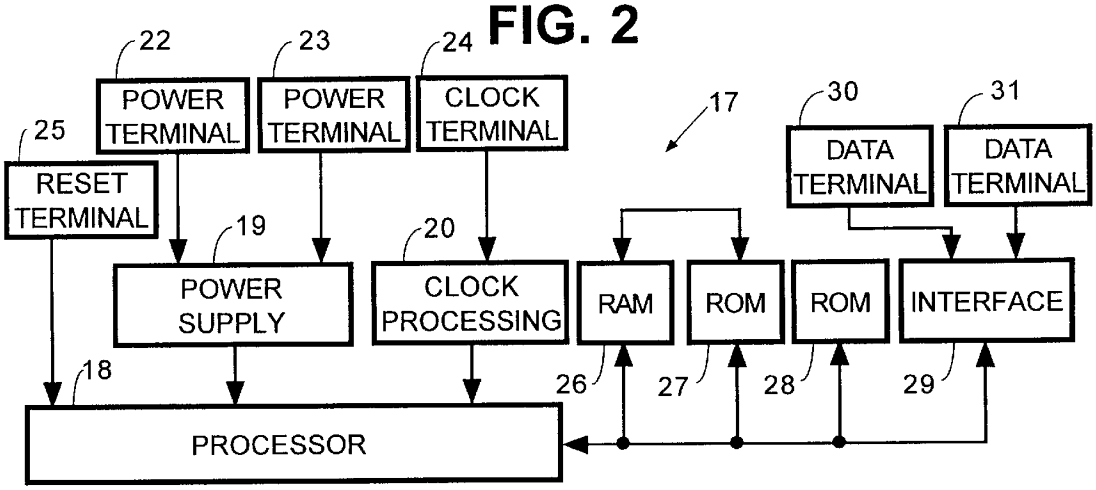
FIG. 2 shows a block circuit diagram of a chip card which can be used in the RDS-TMC radio receiver shown in FIG. 1.

FIG. 2 shows the structure of such a chip card 17 as a block circuit diagram. The core element of the chip card 17 is a processor 18 which is coupled to a power supply circuit 19, a clock processor 20 and a bus 21. The power supply circuit 19 is connected to two terminals 22 and 23 via which the power is supplied by the card reader 16 to the chip card 17. In addition, the clock processor 20 receives a clock signal from the card reader 16 via a terminal 24. The clock processor 20 can derive further clock signals from the clock signal. A further terminal 25, via which a reset signal can be produced by the card reader 16, is connected to the processor 18. Coupled to the bus 21 is a read/write memory 26 (referenced RAM in the following), a read-only memory 27 (referenced program ROM in the following), a read-only memory 28 (referenced data ROM) and an interface unit 29. Data are exchanged between the card reader 16 and the chip card 17 via the interface unit 29 and two connected terminals 30 and 31. The program ROM 27 contains the program necessary for operating the processor 18, the RAM 26 contains data which occur during operation and can be changed and the data ROM 28 contains the TMC data. At least the data ROM 28 forms part of a first memory arrangement.

The control circuit 7 in FIG. 1 supplies part of the received TMC data, which represent coded messages, via the card reader 16 to the chip card 17. Based on these received data, the chip card 17 sends data derived therefrom back to the control circuit 7, which control circuit converts them and further TMC data derived from the memory 12 into control data for the voice output circuit 14 and/or for the visual display 13. The voice output circuit 14 supplies synthesized or stored voice via the control circuit 7 to the audio amplifier 9 after receiving the control data. The control circuit 7 then simultaneously switches the inputs of the audio amplifier to a state so that, instead of the stereo signal from the stereo decoder 4, a voice signal from the voice output circuit 14 reaches the loudspeakers 10 and 11 via the control circuit 7 and the audio amplifier 9. The visual display 13 receives control data from the control circuit 7, which control data represent a message/an announcement in writing.

Figure 3:
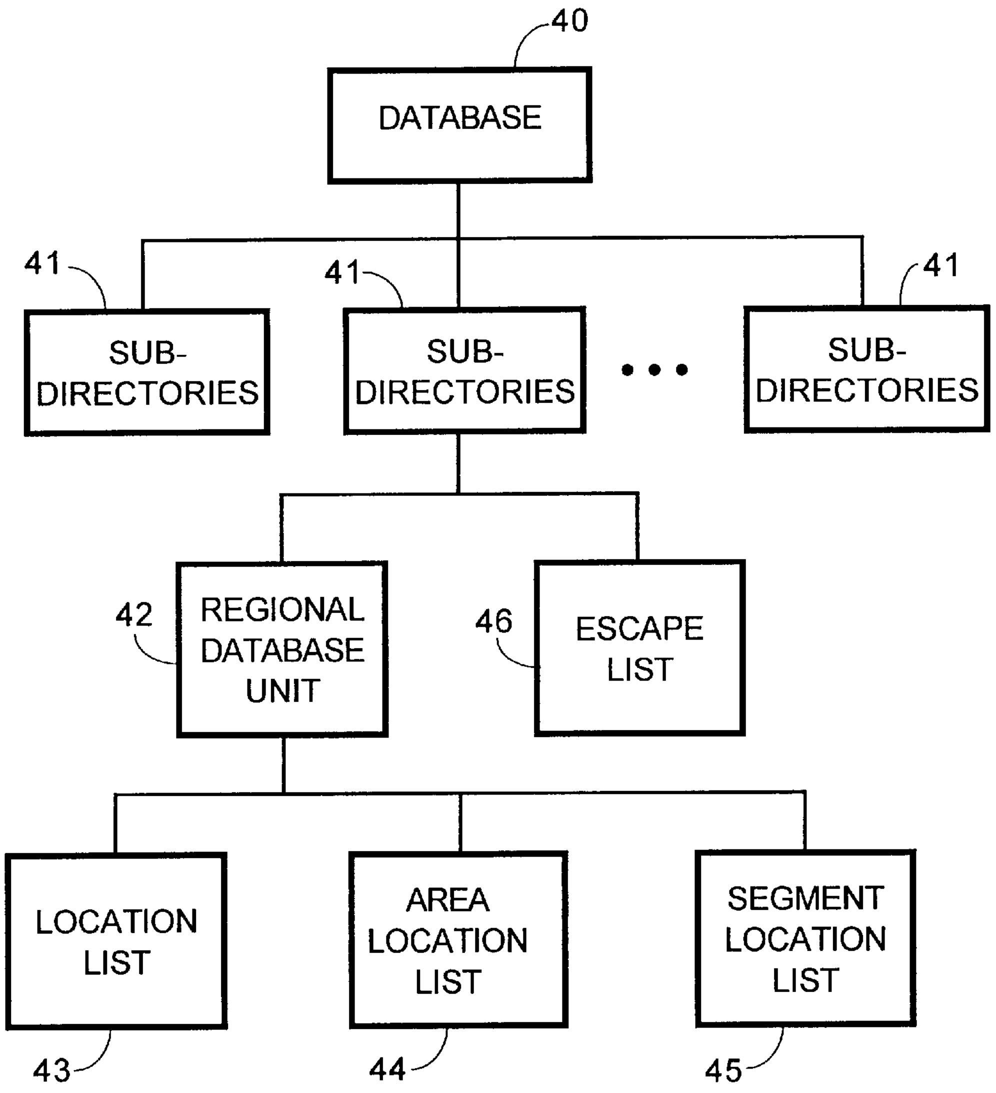
FIG. 3 shows the logical structure of data stored on the chip card shown in FIG. 2.

The TMC data thus contain coded traffic announcements which are decoded by the chip card 7, the memory 12 and the control circuit 7 and converted into voice and in a form to be displayed by the visual display 13. In the data ROM 28 is stored a TMC database 40 (TMCDB) whose logical structure will be explained with reference to FIG. 3 and which is stored as a binary data file.

The TMC database 40 (TMCDB) has a directory structure in whose main directory are stored various general data such as, for example, geographical data, frequency data and so on, and a database volume list. The database volume list refers to at least one subdirectory 41 (VOL) in which are stored identification data, data of a regional database unit 42 (RDB), an escape table 46 (ESC) and various further additional lists 70 (ZUS). The identification data consist of an EBU code (EBU=European Broadcasting Union) and a coded number (database number). The EBU code refers to the state for which messages in the regional database unit 42 are stored. The coded number is used for addressing the regional database unit 42 which contains data for one or more regions in which the chip card 17 is to be used. A region is a certain area which comprises parts of a state, a state or even various states as a whole or in part.

A regional database unit 42 contains a location list 43 (LOL), an area location list 44 (ALL) and a segment location list 45 (SLL). The lists are stored in one or various memory areas. The location list 43 contains locations, for example towns, motorway exits, ports of call of a ferry. The area location list 44 indicates traffic areas (for example, the Ruhr area), government areas (for example, Mittelfranken) or tourist areas (for example, Teutoburger Wald). The segment location list 45 contains lists of roads.

The escape table 46 (ESC) is also stored in one or various memory areas. The escape table 46 is used for compressing location and area names (region-specific). In this table 46 are stored indications and parts of names which repeatedly occur in the location list 43, the area location list 44 and the segment location list 45. For example, the location list not only includes the location "Köln" (Cologne), but also various town districts such as "Köln-Dellbrück", "Köln-Kalk", "Köln-Porz", and so on. To reduce the location list, it contains an escape code for the indication of "Köln" in the location list, which escape code is exactly specified in the escape table 46. The escape table 46 contains an escape code for each indication or for each name segment, which escape code represents an address (for example 2429) in the escape table 46 and the indication to be replaced or the name segment to be replaced in spelling or in phonetic notation. In the following are stated entries of a possible escape table 46:

| EC | RS | LS |
|---|---|---|
| 2209 | Passau | "pas$aU |
| 2367 | Dortmund | "dORt$mUnt |
| 2388 | Euskirchen | "?OYs"kIR$C@n |
| 2418 | Oberhausen | "?:$b=6$haU$z@n |
| 2429 | Köln | "k9ln |
| 2438 | Olpe | "?Ol$p@ |
| 2444 | Rade | "Ra:$d@ |
| 2509 | A1 | \(A1) |
| 2511 | A3 | \(A3) |

In above abstract of an escape table 46, the escape code 2438 represents the location name "Olpe" in writing and in phonetic notation ("?Ol$p@). In the first column is stated the escape code (EC), in the second column an indication in writing (Rechtschrift RS) and in the third column an indication in phonetic notation (Lautschrift LS). Phonetic notations are used according to SAMPA (SAMPA=Speech Assessment Methods Phonetic Alphabet). Frequently used name segments (for example, junction, motorway intersection and so on), which are not region-specific but traffic-specific, can be stored in an additional escape table in the memory 12 of the RDS-TMC radio receiver instead of the escape table 46. Such an optional additional escape table could have the following entries:

| EC | RS | LS |
|---|---|---|
| 0012 | westliches (western) | "vEst$llC$@s |
| 0018 | Autobahnkreuz (motorway intersection) | "?aU$to$ba:n$kROYts |
| 0019 | Anschlußstelle (junction) | "?an$SlUs$StEl$@ |
| 0022 | Raststätte (service area) | "Rast$StE$t@ |

For example, the escape code 0019 in the above additional escape table represents the name segment "Anschlußstelle" (junction) in writing and phonetic notation ("?an$SlUs$StEl$@). This section of an escape table has in the first column an escape code (EC), in the second column an indication in writing (RS) and in the third column an indication in phonetic notation (LS).

The location list 43 contains for each location a location code (for example, 3038) and the name of the location (for example, Nordrhein Westfalen (Nordrhein Westfalia), Köln (Cologne) in writing and in phonetic notation. The location code is a coded message and is used for addressing the respective location names. In the following, five examples of the location list are shown:

| OC | RS | LS | Connotation |
|---|---|---|---|
| 3038 | 0018 2438 | ○ ○ | Autobahnkreuz Olpe (Olpe motorway intersection) |
| 3109 | Lauf | "laUf | Lauf |
| 3621 | 0019 Kusel | ○ ku:$z@l | Anschlußstelle Kusel (Kusel junction) |
| 3783 | 0019 2429-Dellbrück | ○ ○ "dEl$bRYk | Anschlußstelle Köln-Dellbrück (Cologne-Dellbrück junction) |
| 3796 | 0019 2429-Mühlheim | ○ ○ "my:l$halm | Anschlußstelle Köln-Mühlheim (Cologne-Mühlheim junction) |

The above possible location list contains in the first column the location code (OC), in the second column the location name in writing (RS) or wholly or in part in coded form as an escape code, and in the third column the name of the location in phonetic notation (LS) or wholly or in part in coded form as a free variable parameter which always refers to an escape code in the second column of the location list. The above fourth column does not occur in the location list and is only to show the connotations of the individual escape codes in the location list. If, for example, the entry at the location code "3038" is to be read both in writing and in phonetic notation from the chip card 17, the control circuit 7 receives the character sequence "0018 2438" and "○○". The characters "0018" and "2438" represent escape codes in an escape table. For example, Autobahnkreuz (motorway intersection) stands for the escape code "0018" in above additional escape table, and "Olpe" is entered under the escape code "2438". A free variable parameter "○" indicates that the respective phonetic notation is to be read under the entry "0018" or "2438" of an escape table. In the control circuit 7 is then assembled the name of the location searched for under the address "2438" in writing (Autobahnkreuz Olpe) and in phonetic notation ("?aU$to$ba:n$kROYts "?Ol$p@).

The table and lists described thus far contain an entry in writing and in phonetic notation under a location code or escape code. The entries in writing and in phonetic notation are indicated as control data, as observed above.

In the area location list 44, there is an area code (for example 4803) for each area, an area name in writing (for example, Westliches Ruhrgebiet) and an area name in phonetic notation ("vEst$llC$@s "Ru:6$g@%bi:t). The area code is used for addressing the respective area names. In the following are shown four examples from a possible area location list:

| BC | RS | LS | Connotation |
|---|---|---|---|
| 4803 | 0012 Ruhrgebiet (Ruhr area) | ○ "Ru:6$g@%bi:t | Westliches Ruhrgebiet (western Ruhr area) |
| 4991 | Bayerischer Wald | "baI$RIS$=6_"valt | Bayerischer Wald |
| 4994 | Bodensee (Lake Constance) | "bo:$d@n$ze: | Bodensee (Lake Constance) |
| 4996 | Eifel | "?aI$f@l | Eifel |

The above part of a possible area location list contains in the first column an area code (BC), in the second column the area name in writing (RS) or wholly or in part in coded form as an escape code and in the third column the area name in phonetic notation LS) or wholly or in part in coded form as a free variable parameter. The fourth column does not occur in the area location list and is to show the connotations of the escape codes in the area location list. For example, the entry "0012 Ruhrgebiet" in the second column (writing) under the area code 4803 means "Westliches Ruhrgebiet", because the escape code "0012" denotes the name segment "Westliches" (western). The free variable parameter (○) refers to the entry in phonetic notation ("vEst$llC$@s) under the address "0012".

The following control operations are carried out in the control circuit 7. When the control circuit 7 has received, for example, the coded message "4803", this coded message is supplied to the data ROM 28 of the chip card 17 as an address or an area code. The entries in writing (0012 Ruhrgebiet (Ruhr area)) and in phonetic notation (○ "Ru:6$g@%bi:t) are supplied to the control circuit 7 from the chip card 17. The control circuit 7 detects the escape code (0012) and reads the writing and phonetic notation entered under this escape code in the memory 12. In this respect, the control circuit 7 can distinguish, for example, from a first digit, whether the circuit is to read from the escape table in the memory 12 or from the escape table 46 in the data ROM 28. The entry in writing "Westliches" (western) is combined with the entry "Ruhrgebiet" (Ruhr area) entered earlier. Similarly holds for the entries in phonetic notation. If only the phonetic notation is to be assembled and to be fed to the voice output circuit 14, the following procedure is executed. The control circuit recognizes the free variable parameter "○" in phonetic notation (○"Ru:6$g@%bi:t) and therefore reads the appropriate escape code (0012) in the escape table in writing. Subsequently, it reads the entry of the phonetic notation stored under this escape code in the escape table of the memory 12. Then, as explained above, the phonetic notations are combined.

The segment location list 45 contains segments of the roads in writing and in phonetic notation and also a segment code, the latter corresponding to a coded message and being used for addressing the respective segment of the road. Three examples of a possible segment location list are stated below:

| AC | RS1 | LS1 | RS2 | LS2 | RS3 | LS3 | Connotation |
|---|---|---|---|---|---|---|---|
| 5024 | 2511 | ○ | 2429 | ○ | 2418 | ○ | A3, Koln, Oberhausen |
| 5108 | 2509 | ○ | 2367 | ○ | 2388 | ○ | A1, Dortmund, Euskirchen |
| 5130 | 2511 | ○ | 2209 | ○ | Linz | "lInts | A3, Passau, Linz |

The first column of the segment location list 45 contains the segment code (AC). The second column contains the road indication in writing (RS1) or an escape code which refers to the road indication in writing in the escape table 46 (for example, 2511). The third column contains in writing (LS1) the road indication or a free variable parameter which indicates the respective entry of the road indication in phonetic notation in the escape table. The junctions of road segments, which represent the beginning and the end of the respective segment of the road, are shown in writing (for example Linz) or wholly or in part in coded form as an escape code (for example, 2209) in the fourth and sixth columns (RS2, RS3). In the fifth and seventh columns, the junctions are shown in phonetic notation or wholly or in part in coded form as a free variable parameter (LS2, LS3). The seventh column forms no part of the segment location list, but is used for understanding what the respective escape codes mean (for example, A3 motorway, Passau and Linz junctions).

In the various lists shown above, road and area indications are used. To take account of the different road and area indications existing in various states or laender, a hierarchically structured road class and also a hierarchically structured area class are defined. The road class comprises the terms "Motorway", "National", "Country" and "Urban". These terms are assigned class names which denote the types of roads occurring in a state or land. The class names are further assigned categories which may be announced or shown on the visual display 13. The German roads are assigned as follows:

| Class | Name | Category |
|---|---|---|
| Motorway | A | Autobahn |
| National | B | Bundesstraβe (National road) |
| Country | ST | Staatsstraβe (national trunk road) |
| | L | Landstraβe (highway) |
| | K | Kreisstraβe (district road) |
| Urban | R | Straβe (Road) |

The class term "Motorway" is assigned the name "A" and the category "Autobahn", the class term "National" is assigned the name "B" and the category "Bundesstraβe" (national road), the class term "Country" are assigned the names "ST", "L" and "K" and the categories "Staatsstraβe" (national trunk road), "Landstraβe" (highway) and "Kreisstraβe" (district road), and the class term "Urban" is assigned the name "R" and the category "Straβe" (Road)".

For the area class, there may be given a respective table for German areas:

| Class | Name | Category |
|---|---|---|
| Order 1 | SA | Land (country) |
| Order 2 | BL | Bundesland (land) |
| Order 3 | RB | Regierungsbezirk (administrative district) |
| Order 4 | KR | Kreis (district) |
| Municipality | SD | Stadt (town) |
| | GE | Gemeinde (municipality) |
| | OT | Stadtteil (town district) |

The area class contains the terms "order 1 to order 4" and "municipality". The name "SA" and the category "Land" (country) are assigned to the class term "order 1", the name "BL" and the category "Bundesland" (land) are assigned to the class term "order 2", the name "RB" and the category "Regierungsbezirk" (administrative district) are assigned to the class term "order 3", the name "KR" and the category "Kreis" (district) are assigned to the class term "order 4", and the names "SD", "GE" and "OT" and the categories "Stadt" (town), "Gemeinde" (municipality), and "Stadtteil" (town district) are assigned to the class term "Municipality".

The above class names for the road and area classes are thought of in the location list, area location list and segment location list 43 to 45. These lists 43 to 45 contain each at least one more column which denotes the class name of a road or area. In the following section of a location list 43 are shown the location code (OC), the connotation of the location code, an indication (Ind) and the class name:

| OC | Connotation | Ind. | Class name |
|---|---|---|---|
| 3038 | Autobahnkreuz Olpe (Olpe motorway intersection) | A4 / A45 | A |
| 3040 | Autobahn A3 (A3 motorway) | A3 | A |
| 3621 | Anschluβstelle Gladbeck (Gladbeck junction) | A31 | A |
| 3809 | Bundesstraβe 224 (national road 224) | B224 | B |
| 3907 | Staatsstraβe ST2241 (national trunk road ST 2241) | ST2241 | ST |
| 3790 | Kreisstraβe K676 (District road K676) | K676 | K |
| 3843 | Landstraβe L2400 (L2400 highway) | L2400 | L |

-continued

| OC | Connotation | Ind. | Class name |
|---|---|---|---|
| 3950 | Bochumer Straβe (Bochum Road) | | R |
| 3987 | Pegnitzgrund | | R |

The first column states the location code (OC), the second column the connotation of the location code, the third column the indication and the fourth column the class name of the location code. The second column does not occur in the location list stored in the data ROM 28 of the chip card 17 and is only to show what the individual location codes mean. The indication (Ind) denotes either the respective road (for example, A3 motorway) or the road or roads which form part of the respective location (Gladbeck junction to the A32 motorway). Furthermore, the writing and the phonetic notation are omitted from the section of the location list for reasons of clarity.

An area location list 44 also has a column for a class name. A section of such an area location list 44 could have the following entries:

| BC | Connotation | Class Name |
|---|---|---|
| 4587 | Bayern (Bavaria) | BL |
| 4589 | Hessen | BL |
| 4621 | [Regierungsbezirk] Arnsberg (administrative district, Arnsberg) | RB |
| 4654 | [Regierungsbezirk] Unterfranken (administrative district, Unterfranken) | RB |
| 4764 | [Kreis] Recklinghausen (district, Recklinghausen) | KR |
| 4783 | Köln (Cologne) | SD |
| 4813 | [Stadt] Recklinghausen (town, Recklinghausen) | SD |
| 4934 | [Köln-] Mühlheim (Cologne-Mühlheim) | OT |
| 4950 | [Essen-] Werden | OT |

In this section of the area location list 44, the writing and phonetic notation are not shown either for reasons of clarity. The first column of the area location list contains the area code, the second column the connotation of the area code and the third column the class of the area code. The second column is not included in the data ROM 28 of the chip card 17, as has already been explained above. The terms in square brackets (for example, [Regierungsbezirk]) are used for additionally explaining the difference between a town and a district.

A segment location list 45 also has a column for indicating the class names (for example, "A" for Autobahn (motorway) of the segment. There may be another column available in the segment location list 45 for indicating the segment.

When a message for the voice output circuit 14 or the visual display 13 is formed in the control circuit 7 of the RDS-TMC radio receiver, the control circuit 7 is supplied with control data from the data ROM 28 (first memory arrangement) of the chip card 17 and from the memory 12 (second memory arrangement). Control data are also needed for that purpose, which control data refer to an area or a road. As a result of the different road or area indications in different states, laender and districts, identical and general indications are selected for different class names in the memory 12. For example, the following additional lists are stored in the memory 12:

| Class | Name | Category |
|---|---|---|
| Motorway | A | Autobahn |
| National | B | |
| Country | ST | Straβe |
| | L | |
| | K | |
| Urban | R | |
| Order 1 | SA | Bereich |
| Order 2 | BL | |
| Order 3 | RB | |
| Order 4 | KR | |
| Municipality | SD | Stadt |
| | GE | |
| | OT | |

If the control circuit 7 receives control data for a road having the class name "B", for example, from the location list 44 stored in the data ROM 28 of the chip card 17, when a message is formed, the control circuit 7 extracts for this class name "B" the "road" category from the memory 12 if no further accurate indications are available on the chip card 17. If control data are sent from the chip card 17 to the control circuit for an area, for example, having the class name "BL", the control circuit 7 extracts the "area" category from the memory 12, provided that no further more accurate indications about the area categories are stored in the data ROM 28 of the chip card 17.

A more accurate indication of the category may be obtained when indications are stored in the additional lists 70 in the data ROM 28 for this purpose. Whether such additional lists are available, appears, for example, from a coding which features the chip card 17. These additional lists 70 may have the following entries:

| Class | Name | Category |
|---|---|---|
| Motorway | A | Autobahn |
| National | B | Bundesstraβe (national road) |
| Country | ST | Staatsstraβe (national trunk road) |
| | L | Landstraβe (highway) |
| | K | Kreisstrβe (district road) |
| Urban | R | Straβe (road) |
| Order 1 | SA | Land (country) |
| Order 2 | BL | Bundesland (land) |
| Order 3 | RB | Regierungsbezirk (administrative district) |
| Order 4 | KR | Kreis (district) |
| Municipality | SD | Stadt (town) |
| | GE | Gemeinde (municipality) |
| | OT | Stadtteil (town district) |

If data of the two additional lists in the data-ROM 28 can be fallen back on, the category of "Bundesstraβe" (national road) is used for a road when a message is formed in the control circuit 7, for example, with control data having the class name "B", and the category of "Bundesland" (land) is used for an area with control data having the class "BL".

The control circuit 7 thus verifies whether a category for a class name is stored in an additional list 70 on the chip card 17. If this is the case, the respective category stored on the chip card 17 is used for forming a message. Otherwise, the category is extracted from the memory 12 which is entered for the class name.

The examples used thus far in the additional lists 70 are valid for the state of Germany. This means that on a chip card 70, the above-mentioned entries may be used for the region of Germany. A chip card 17 for the region or the state of France will contain different categories from German road indications. An additional list 70 for France may contain the following categories:

| Class | Name | Category |
|---|---|---|
| Motorway | A | Autoroute |
| National | N | Route nationale |
| Country | D | D-route |
| | C | Road |
| Urban | R | Road |

This additional list 70 valid for France thus contains for the class term “motorway” the class name “A” and the category “motorway”, for the class term “national” the class name “N” and the category “Route Nationale”, for the class term “country” the class names “D” and “C” as well as the categories “D-route” and “road” and for the class term “urban” the class name “R” and the category “road”.

An additional list 70 for an area class for France may contain the following entries:

| Class | Name | Category |
|---|---|---|
| Order 1 | SA | Country |
| Order 2 | DP | Départment |
| Order 4 | KO | Commune |
| Municipality | SD | Town |

In this additional list 70, valid for France, are entered class terms for an area class. The class term “order 1” is assigned to the class name “SA” and the category “Country”, the class term “order 2” is assigned to the class name “DP” and the category “Départment”, the class term “order 4” is assigned to the class name “KO” and the category “Commune” and the class term “Municipality” is assigned to the class name “SD” and the category “Town”. Since the class term “order 3” is not utilized in France, no class name and no category is available therefor.

The location, area location and segment location lists 43 to 45 may have further columns, as required, to supply further messages to the respective user of the RDS-TMC radio receiver for certain entries in the table/lists 43 to 46. Location codes, area codes and segment codes are specific names for respective coded announcements, as observed above.

For forming a complete message/announcement that can be processed by the voice output circuit 14 or the visual display 13 in the RDS-TMC radio receiver, a further list of standard phrases is stored in the memory 12. The memory 12 thus contains event-specific control data (in a standard phrase list) and traffic-specific control data (additional substitute list). With such a standard phrase list, the following announcements could, for example, be generated in writing in the control circuit 7:

| | |
|---|---|
| 1 | Im Bereich Teutoburger Wald: Nebel<br>(In the Teutoburger Wald area: Fog) |
| 2 | Im Stadtgebiet Dresden: Sportveranstaltung.<br>(In the Dresden town area: Sports event) |
| 3 | A2, Dortmund Richtung Hannover, zwischen Rehren und Lauenau: 4 km Stau.<br>(A2, Dortmund direction Hannover, between Rehren and Lauenau: 4 km tailback) |
| 4 | A4 Kolner Ring, Aachen Richtung Olpe, Autobahnkreuz Koln-Ost: Ausfahrt gesperrt.<br>(A4 Cologne orbital road, Aachen direction Olpe, Motorway intersection Cologne-East: blocked exit) |

-continued

| | |
|---|---|
| 5 | A3, Koln Oberhausen, zwischen Anschlußstelle Köln-Dellbrück und Anschlußstelle Köln-Mühlheim: zähfließender Verkehr<br>(A3, Cologne Oberhausen, between Cologne-Dellbruck junction and Cologne-Mühlheim junction: slowly moving traffic) |

The announcement Nr. 5 could, for example, have been received in coded form by the RDS-TMC radio receiver:

P1{5024, 3783, 3796}, P2

The announcement is formed by two standard phrases P1 and P2. In the standard phrase P1, the indications or name segments stored under the codes (addresses i.e. arguments of P1), “5024”, “3783” and “3796” are to be read from the chip card 17. For example, the code “5024” can be found in the segment location list. Under the segment code “5024” is entered in writing “A3, Cologne, Oberhausen”. The two other arguments or codes of P1 may be found in, for example, a location list. Under the location code “3783” is entered in writing “Cologne-Dellbrück” and under the location code “3796” is entered in writing “Cologne-M ühlheim”. If instead of the codes the respective indications in writing are put in the standard phrase P1, the result will be:

P1{(A3, Cologne, Oberhausen), Cologne-Dellbrück junction, Cologne-Mühlheim junction}+P2

The precise text in writing for the standard phrase P1 or P2 respectively, is taken from the standard phrase list and reads:

P1=<road number>, <junction> direction <junction>, between <name of town> and <name of town>:

P2=slowly moving traffic

In between the brackets are stated the variables which are to be replaced by the above names in writing (for example, A3). This leads to the announcement:

“A3, Cologne direction Oberhausen, between Cologne-Dellbrück Cologne-Mühlheim junctions: slowly moving traffic”.

The segment location list 45 contains—as observed above—also a column for a class name. Under the segment code “5024” is entered the class name “A”. The indication “motorway” entered under the class name “A” in memory 12 or the data ROM 28 of the chip card 17 is extracted and then a complete announcement is formed:

“A3 motorway, Cologne direction Oberhausen, between Cologne-Delbrück and Cologne-Mühlheim junctions: slowly moving traffic”.

Other announcements can also be processed by the radio receiver. Such announcements may be, for example, 1) “Auf der Straβe L2400 von Olpe nach Siegen: Straβensperrung”
2) “Auf der Landstraβe L2400 von Olpe nach Siegen: Straβensperrung”
3) “Unfall auf der Straβe N96 von Paris nach Lyon”
4) “Unfall auf der Nationalstraβe N96 von Paris nach Lyon”
5) “Im Bereich Rheinland-Pfalz: Nebel”
6) “Im Bundesland Rheinland-Pfalz: Nebel”
7) “Verkehrsstörungen durch Manöver im Bereich Normandie”
8) “Verkehrsstörungen durch Manöver im Departement Normandie”.

(1) “On the L2400 road from Olpe to Siegen: road blocking”
2) “on the L2400 highway from Olpe to Siegen: road blocking”

3) "accident on the N96 road from Paris to Lyon"

4) "accident on the Route Nationale N96 from Paris to Lyon"

5) "In the Rheinland-Pfalz area: fog"

6) "In the Rheinland-Pfalz land: fog"

7) "Traffic disturbance due to manoeuvres in the Normandy area"

8) "Traffic disturbance due to manoeuvres in the Département of Normandy").

When the announcement 1) is assembled, the class name "L" is found in the location list 43 for the road names for a German-speaking user who utilizes the chip card 17 for the region of "Germany". If there is no additional list 70 on the chip card 17, the category of "road" is extracted from the class names of the memory 12. If there is indeed an additional list, the announcement 2) is issued for which the category "highway" is stored in the additional list 70 for the class name "L".

The announcements 3) and 4) are formed for a German-speaking user with the aid of a chip card for the region of "France". When the announcement 3) is made, an additional list 70 cannot be reverted to. In that case, the category "road" is indicated for the class name "N" of the road name "N96". When the announcement 4) is formed, there is read in an additional list 70 that the category of "Route Nationale" is entered for the class name "N".

The above method is also used for the announcements 5) to 8). For the announcements 5) and 7), entries in an additional list cannot be reverted to. For the area class name "BL" with the announcement 5), the category "area" is found in the memory 12 and when the announcement 6) is formed, the category "land" is found in an additional list 70. The category "area" is extracted from the memory 12 for the class name "DP" when the announcement 7) is formed, and the category "Département" is taken from an additional list 70 for the class name "DP".

The measures for assembling an announcement to be displayed on the visual display 13 which are carried out in the control circuit 7, are similarly carried out for assembling the phonetic notation which is delivered to the voice output circuit 14.

The above-mentioned RDS-TMC radio receiver and the chip card 17 are suitable for a user—as observed above—who is informed of the traffic information in the German language by means of the visual display 13 and/or the voice output circuit 14. Such an RDS-TMC radio receiver and also the chip card 17 may also be arranged for other languages. In that case, the memory 12 and the data ROM 28 of the chip card 17 may store the respective writing and/or phonetic notation of that language.

There is a further possibility to utilize the RDS-TMC radio receiver and the chip card 17 for a plurality of languages. However, for keeping the cost and circuitry low, a radio receiver should be arranged for a specific language (language-specific receiver). Therefore, only one spelling and/or phonetic notation is stored for one language (for example, German) in the memory 12. In contrast, a chip card 17 is arranged region-specifically. In its data ROM 28 are stored region-specific data in various languages. If, for example, the German, English, French and Dutch languages are to be used, the table/lists stored in the data ROM 28 of the chip card 17 are extended. For example, the escape table 46 has the following entry under the escape code "2429":

| EC | RSd | LSd | LSe | LSf | LSn |
|---|---|---|---|---|---|
| 2429 | Köln | "k9ln | ¶$k@"1@Un (Cologne) | ¶$ko"lOj (Cologne) | ¶"kui$l@n (Keulen) |

For the location "Köln", the escape table 46 has under the escape code "EC" "2429" the German writing (RSd) and phonetic notation (LSd) and the English (LSe), the French (LSf) and the Dutch phonetic notations (LSn). Entries for the writing of the non-German languages may be stored, as required. The spellings of the non-German languages are stated in brackets underneath the respective phonetic notations. The phonetic notations of the non-German languages represent further first additional components of the control data which are stored under the escape code "2429". For the non-german languages, a first division mark (¶) is put before each phonetic notation. These first division marks indicate that the non-German languages are entered in the list in a predefined order (standard order). The order of the table entries for the various languages is thus fixed. A standard order also occurs when languages have been omitted at the end of the order (for example, Dutch).

If there is no difference from the German phonetic notation in another language for a particular indication, no such entry will be available in the list. For example, let us suppose that the phonetic notation for the location "Köln" in the French language is identical with the phonetic notation in the German language. In that case, the escape table 46 does not have an entry for the French language. The respective non-German languages are then to be featured in the list for the location "Köln". For featuring the English-language phonetic notation, a second division mark "‡" with a further language-specific character (e) precedes the phonetic notation. In the Dutch language, "‡n" precedes. The second division mark "‡" is thus complemented by the language-specific character "n". The entry for the location "Köln" would look as follows in this assumed case:

| EC | RSd | LSd | LSe | LSn |
|---|---|---|---|---|
| 2429 | Köln | "k9ln | ‡e$k@"l@Un | ‡n"kui$l@n |

In the location list 43 mentioned above by way of example, the location "Lauf" is entered under the location code "3109". For this location there is neither an English nor a French nor a Dutch spelling and phonetic notation. If an indication (for example, the location "Lauf") is written and pronounced in the English, French and Dutch languages as it is done in the German language, there will be no further entry in writing and phonetic notation.

If there is a combination of at least one indication with different phonetic notations and at least one indication with the same phonetic notation in the various languages, the indication with the different phonetic notations is entered in the escape table 46 and the respective table contains the escape code for this indication. For example, the location list 43 has as an entry the location "Köln-Mühlheim" under the location code "3886". For "Köln", the escape code "2429" is referred to in the escape list 43. The indication of "M ühlheim" has the same pronunciation in all the given languages. Thus, the respective entry in the location list 43 looks as follows:

| | | |
|---|---|---|
| 3886 | 2429-Mühlheim | ○ "my:l$halm |

For the indication "Köln", it is not necessary for the non-German languages to have an entry in the location list 43, in spite of the different phonetic notations, because these notations are already available in the escape table 46.

Thus the location list 43, the area location list 44, the segment location list 45, the escape table 46 and the additional list contain non-German phonetic notations, if they deviate from the German rendering. Furthermore, the list of standard phrases and the road and area lists respectively, contain entries in English, French and Dutch. For the German standard phrase:

"<Straßennummer>, <Ortsname>, 10 Kilometer Stau"

there is the corresponding French entry in the list of standard phrases:

"Sur l'autoroute <name of road> à la hauteur de <name of location>, bouchon sur 10 kilomèters".

For the name of the road and the name of the location, the name of the road (for example, "A4") with the road indication and the respective name of the location (for example, "Köln") are to be delivered to the control circuit 7.

When this message is assembled in the control circuit 7, first the respective control data are taken from the list of standard phrases. If only French entries are stored in the memory 12 (radio receiver for the French language), the control data will contain only entries for the French language and no selection of the control data is to be carried out. If the memory 12, however, contains entries for the French and German languages, and if the German language is stored as the first language, a selection of, for example, the French entry in phonetic notation will be made after the control data of the list of standard phrases have been received.

Subsequently, the French entries in phonetic notation for the road indication "A4" and the location "Köln" are searched for. For the location "Köln", it is then necessary first to have a look at the location list in which control data have been entered under a respective location code (coded message). If the location list has entries for the German language (as the first language) and can contain entries for the English, French and Dutch languages, the respective French entry is searched for after the control circuit 7 has received the control data from the location list. This French entry does not exist, because in the first main component of the German language (German spelling) only one escape code has been entered. The German phonetic notation may be omitted or may have a free variable parameter. The control circuit 7 subsequently takes the control data of the respective escape code from the escape table 46 which is stored in the data ROM 28 of the chip card 17. The French entry in phonetic notation for the location "Köln" is taken from the received control data and inserted into the standard phrase. The same procedure is carried out by the control circuit 7 when the French entry in phonetic notation for the road indication "A4" is extracted.

A plurality of languages may be entered in the additional list 70 of the data ROM 28 (first memory arrangement) and the additional list of the memory 12 (second memory arrangement). These entries are also made in the way described above.

Figure 4:
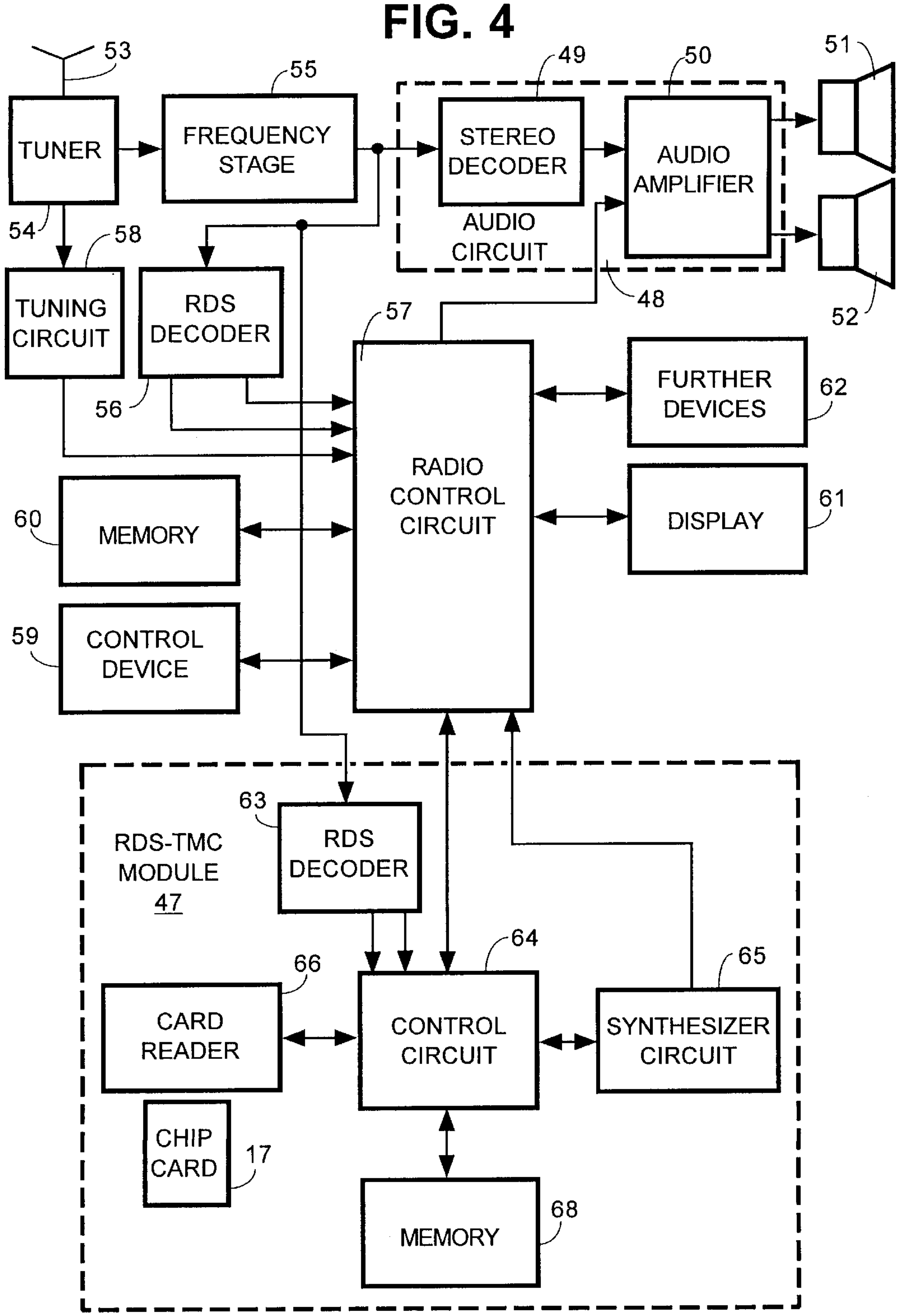
FIG. 4 shows a second illustrative embodiment of an RDS-TMC radio receiver comprising an RDS-TMC data processing module coupled to the RDS-TMC radio receiver.

FIG. 4 shows a further radio receiver which is coupled to an RDS-TMC module 47 via various lines. The radio receiver comprises an audio circuit 48 which includes a stereo decoder 49 and an audio amplifier 50, and two loudspeakers 51 and 52. The audio circuit 48 receives a radio signal received by an antenna 53 and transferred via a tuner 54 and an Intermediate Frequency stage 55. In the stereo decoder 49 is formed a low-frequency stereo signal which is supplied to the two loudspeakers 51 and 52 via the audio amplifier 50. The output signal of the IF stage 55 is also supplied to an RDS-decoder 56 and the RDS-TMC module 47. The RDS-decoder 56 extracts RDS data from the low-frequency signal produced by the IF stage 55. The RDS data and, furthermore, a clock signal are supplied to a radio control circuit 57 by the RDS-decoder 56. The tuner 54 is set by the RDS data and data which are produced by a control device 59. For this purpose, the respective data are supplied to a tuning circuit 58 of the radio control circuit 57 which tuning circuit controls the tuner 54.

Further, a memory 60, a visual display 61 and one or more further arrangements 62, for example, a cassette drive, a CD drive, a car telephone and so on, are coupled to the radio control circuit 57. In addition, via several lines the radio control circuit 57 is coupled to the RDS-TMC module 47 which comprises an RDS-decoder 63, a control circuit 64, a voice output circuit 65, a card reader 66 for inserting a chip card 17, and a memory 68. The RDS-decoder 63 supplies the RDS-TMC data extracted from the output signal of the IF stage 55 and a clock signal to the control circuit 64. The control circuit 64, which processes RDS-TMC data as does the control circuit 7 of FIG. 1, supplies TMC data to the card reader 66 and forms from the data received from the card reader 66 and furthermore received from the memory 68 (data in writing and phonetic notation), control data which are supplied to the voice output circuit 65. The voice output circuit 65 produces synthetic voice from the control data, which voice is supplied to the audio amplifier 50 via the radio control circuit 57. Furthermore, the control circuit 64 forms traffic announcements in writing from the control data, which traffic announcements are supplied to the visual display 61 via the radio control circuit 57.

I claim:

1. A radio receiver comprising a control circuit (7)

for supplying coded messages derived from a radio signal to at least one memory arrangement (12, 28), for receiving control data derived from the coded messages and originating from at least one memory arrangement (12, 28), and for forming messages from the control data in a form suitable for a visual display (13) and/or a voice output circuit (14), characterized in that a reading device (16) for reading data from an external first memory arrangement (28), and a second memory arrangement (12) are coupled to the control circuit (7), and in that the first memory arrangement (28) is used for storing control data for region-specific road or area categories and the second memory arrangement (12) is used for storing control data for supra-regional road or area categories, which categories have each a respective class name.

2. A radio receiver as claimed in claim 1, characterized in that the control circuit (7) for the formation of a message containing a road or area name, is used for extracting a class name assigned to the control data of the road or area name from a memory arrangement (12, 28), extracting control data for road or area categories from the first memory arrangement (28), if control data for road or area categories for the class name are stored in the first memory arrangement (28), and furthermore for extracting control data for road or area categories from the second memory arrangement (12).

3. A radio receiver as claimed in claim 2, characterized in that the two memory arrangements (12, 28) are provided for storing certain different control data under a respective escape code and in that the control circuit (7), once it has received the control data containing at least one escape code, is used for supplying at least one escape code to the first or second memory arrangement (12, 28) and for receiving control data stored under the escape code.

4. A radio receiver as claimed in claim 3, characterized in that control data stored in at least one memory arrangement (12, 28) under a respective coded message or an escape code contain the derivable writing and/or phonetic notation of at least a first language and only the derivable writing and/or phonetic notation of at least a further language, if the writing and/or phonetic notation of the further language deviates from the first language.

5. A radio receiver as claimed in claim 4, characterized in that at least one memory arrangement (12, 28) contains lists (43, 44, 45) of specific control data assigned to a respective coded message, which lists are assigned to memory areas, and an escape table (46) containing the escape codes and the respective assigned control data.

6. A radio receiver as claimed in claim 5, characterized in that the lists (43, 44, 45) not only contain control data in writing and/or phonetic notation for a coded message but also a class name if the coded message relates to a road or area name.

7. A radio receiver as claimed in claim 6, characterized in that the two memory arrangements (12, 28) have additional lists (70) containing class names and control data for the assigned road or area category, which lists are assigned to memory areas.

8. A radio receiver as claimed in claim 1, characterized in that at least one memory arrangement (28) forms part of a chip card (17) which is used for inserting into a card reader (16).

9. A radio receiver as claimed in claim 1, characterized in that the coded messages transmitted along in the radio signal are traffic announcements and/or weather reports.

10. A module (47) for processing coded messages derived from a radio signal, comprising a control circuit (64)

for supplying coded messages derived from the radio signal to at least one memory arrangement (28, 68), for receiving control data derived from the coded messages and originating from at least one memory arrangement (28, 68), and for forming messages from the control data in a form suitable for the visual display and/or a voice output circuit (62), characterized in that a reading device (66) for reading data from an external first memory arrangement (28), and a second memory arrangement (68) are coupled to the control circuit (64), and in that the first memory arrangement (28) is used for storing control data for region-specific road or area categories and the second memory arrangement (68) is used for storing control data for supra-regional road or area categories, which categories have each a respective class name.

11. A memory arrangement (28) for a radio receiver or for a module (47) for processing coded messages for storing control data for each coded message, which coded messages are derived from a radio signal, characterized in that the memory arrangement (28) is used for storing control data for region-specific road or area categories which have each a respective class name.

12. A chip card (17) for inserting into a card reader (16, 66) for a radio receiver or for a module (47) for processing coded messages derived from a radio signal, comprising a memory arrangement (28) for storing control data for each coded message, characterized in that the memory arrangement (28) is provided for storing control data for region-specific road or area categories which have each a respective class name.

* * * * *